United States Patent [19]

Makio et al.

[11] Patent Number: 5,757,827
[45] Date of Patent: *May 26, 1998

[54] SECOND HARMONIC GENERATING APPARATUS AND APPARATUS EMPLOYING LASER

[75] Inventors: Satoshi Makio; Tsuyoshi Miyai, both of Kumagaya; Yasunori Furukawa; Masayoshi Sato, both of Fukaya, all of Japan

[73] Assignee: Hitachi Metals, Ltd., Tokyo, Japan

[*] Notice: The term of this patent shall not extend beyond the expiration date of Pat. No. 5,583,882.

[21] Appl. No.: 839,388

[22] Filed: Apr. 18, 1997

Related U.S. Application Data

[63] Continuation of Ser. No. 396,138, Mar. 1, 1995, abandoned.

[30] Foreign Application Priority Data

Jul. 26, 1994 [JP] Japan .................. 6-173955

[51] Int. Cl.$^6$ .................................................. H01S 3/10
[52] U.S. Cl. .................. 372/22; 372/92; 372/98; 372/105
[58] Field of Search ........................... 372/92, 98, 22, 372/21, 19, 105, 41, 75, 34, 108

[56] References Cited

U.S. PATENT DOCUMENTS

| | | |
|---|---|---|
| 3,934,210 | 1/1976 | Yarborough et al. . |
| 4,811,349 | 3/1989 | Payne et al. . |
| 5,105,434 | 4/1992 | Krupke et al. ............... 372/41 |
| 5,144,630 | 9/1992 | Lin ............................. 372/22 |
| 5,243,611 | 9/1993 | Hyuga et al. ................ 372/22 |
| 5,247,650 | 9/1993 | Amano ........................ 372/22 |
| 5,249,189 | 9/1993 | Scheps ........................ 372/69 |
| 5,258,989 | 11/1993 | Raven ......................... 372/75 |
| 5,317,447 | 5/1994 | Baird et al. ................. 372/22 |
| 5,341,388 | 8/1994 | Masuda et al. .............. 372/34 |
| 5,390,211 | 2/1995 | Clark et al. ................. 372/21 |
| 5,583,882 | 12/1996 | Miyai et al. ................. 372/22 |

FOREIGN PATENT DOCUMENTS

| | | |
|---|---|---|
| 6204597 | 7/1994 | Japan . |
| WO-A-93 14542 | 7/1993 | WIPO . |

*Primary Examiner*—Leon Scott, Jr.
*Attorney, Agent, or Firm*—Staas & Halsey

[57] ABSTRACT

A second harmonic generating apparatus including a semiconductor laser serving as a pumping source, a resonator structure for oscillating a first radiation wave generated by LiSAF (Cr:LiSrAlF$_6$: Lithium strontium aluminum fluoride with chromium added) crystal which is a solid-state laser crystal which is excited by the pumping source, a control element for controlling the wavelength of the first oscillation wave, and a nonlinear crystal for performing wavelength conversion into second harmonic which is a second oscillation wave, with the first oscillation wave serving as a fundamental wave, the nonlinear crystal being provided in the resonator. A higher efficiency and reliability of the second harmonic generating apparatus is achieved.

18 Claims, 7 Drawing Sheets

SECOND HARMONIC GENERATING APPARATUS AND APPARATUS EMPLOYING LASER

This application is a continuation of application Ser. No. 08/396,138, filed Mar. 1, 1995, now abandoned.

BACKGROUND OF THE INVENTION

1. Field of the Invention

The present invention relates to the optoelectronics field and, more particularly, to a visible laser light source and a laser printer, a photofabrication apparatus, and an optical recording apparatus which employ the visible laser light source.

2. Description of the Related Art

With the growing advanced information age, there has been increasing demand for shorter wavelength to meet the needs for higher recording density and higher printing speed in the optical recording field which includes optical disk apparatuses and laser printers. There are currently available, however, only gas laser apparatuses including a helium-cadmium (He—Cd) laser apparatus and argon (Ar) laser apparatus as light sources capable of providing satisfactory blue radiation range (wavelength: 400 to 480 nm) for which there is high demand at the commercialization level. These gas lasers are large and heavily consume electric power, making them unsuited for use in optical disk apparatuses, for example. The aforesaid gas laser apparatuses are actually incorporated in some laser printers as light sources, however, they are likely to be an obstacle in achieving smaller size and lower electric power consumption in the future.

Figure 10:
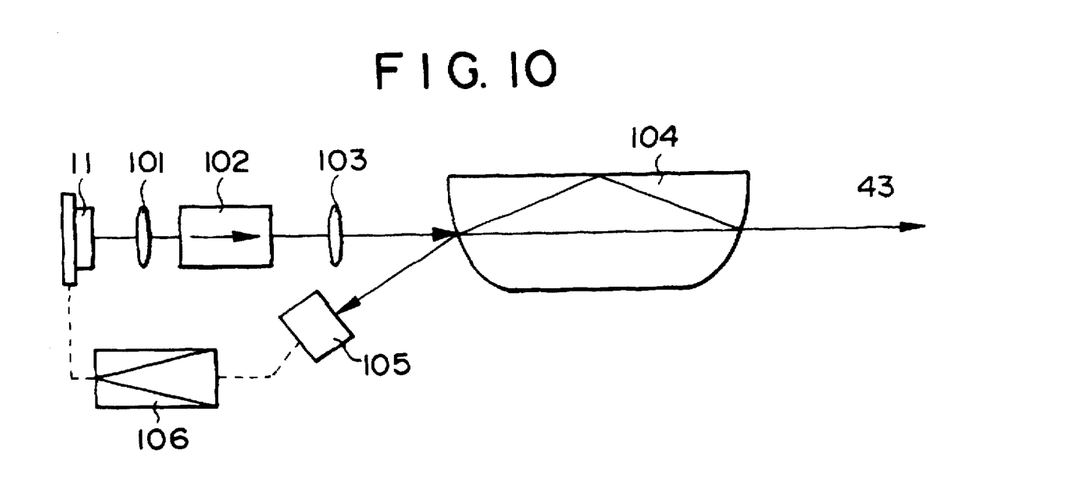
FIG. 10 is a diagram illustrative of a conventional embodiment.

To solve the problem stated above, an art has been proposed whereby shorter wavelength can be attained by making use of optical second harmonic generation (hereinafter referred to as "SHG"). The study of the art for putting an SHG light source in practical use has made progress as the output of a semiconductor laser has been increased. Such progress comes from the following factors: electric discharge, which is required in conventional gas lasers, is no longer necessary; there is a feasibility of ① smaller size and ② lower power consumption; and high reliability of the SHG light sources which are supported by the stable output and prolonged service life of exciting semiconductor lasers (③ stable output and ④ extended service life). There has been proposed a method for achieving the SHG light source which has a similar output wavelength to that of the aforesaid gas laser. According to a method, as shown in FIG. 10, a near-infrared semiconductor laser output is used as the first oscillation wave, i.e. the fundamental wave which is then resonated by an external resonator. A nonlinear optical crystal (hereinafter referred to simply as "SHG crystal" since the wavelength conversion to be discussed below will always be based on SHG) which is composed of KN (KNbO₃: potassium niobate) crystal is provided in the resonator to produce the second oscillation wave, i.e. the blue laser beam which is SH wave ("Generation of 41 mW of blue radiation by frequency doubling of a GaAlAs diode laser" by W. J. Kozlovsky and W. Lenth, Appl. Phys. Lett., vol. 56, No. 23, p2291, 1990.)

In the SHG light source, however, an optical isolator 102 must be provided to protect the semiconductor laser from reflected return light in order to accomplish stable matching of the oscillation wavelength of the semiconductor laser, which is susceptible to disturbance, to the wavelength at which KN crystal performs maximum conversion efficiency.

There is also a highly technical challenge: in order to control the length of the external resonator which includes KN crystal to the wavelength order of the fundamental wave, a reflected light coming from the resonator must be received by an optical detector 105 and an electrical output thereof must be controlled through a feedback circuit 106 to ensure stable oscillation of the semiconductor laser. This is expected to be extremely difficult to achieve at commercialization level. It is considered extremely difficult for the SHG light source to accomplish the stable matching of the oscillation wavelength of the semiconductor laser, which is susceptible to disturbance, to the wavelength at which KN crystal performs maximum conversion efficiency and to control the length of the external resonator, which includes KN crystal, to the wavelength order of the fundamental wave at the commercialization level.

There is available the SHG system which employs an internal resonator as a means for achieving the two technical tasks described above. According to the method, the oscillation wave of a solid-state laser provides the fundamental wave and an SHG crystal is disposed in the resonator of the solid-state laser.

In the intracavity doubling laser system, the resonator which composes the solid-state laser is constituted by mirrors which exhibit high reflection at the oscillation wavelength of the solid-state laser and which are positioned at both ends of the resonator. Due to this structure, the oscillation wavelength is hardly subjected to the influences exerted by disturbance caused by waves of other wavelengths or the like. Further, the intracavity doubling laser solves another problem inherent in the external resonator. More specifically, intracavity doubling laser hardly suffers from the influences on the efficiency of SHG conversion exerted by the changes in the oscillation wavelength caused by the changes in the wavelength order of the length of the resonator due to temperature changes and/or vibration.

Recently, there has been proposed LiSAF (Cr:LiSrAlF₆: Lithium strontium aluminum fluoride with chromium added) crystal as a laser crystal which is oscillated at 750 to 1000 nm and which is used for variable-wavelength solid-state laser apparatus excited by semiconductor laser (U.S. Pat. No. 4,811,349).

It is possible to use LiSAF crystal as a laser crystal, the wavelength of which can be varied over a broad band by using a wave control element. The inventors studied a method wherein the LiSAF laser is employed to generate the first oscillation wave (fundamental wave) and a nonlinear crystal is used to generate SHG beam of the blue radiation region as the second oscillation wave. As a result of the study, the inventors found two problems.

Figure 4:
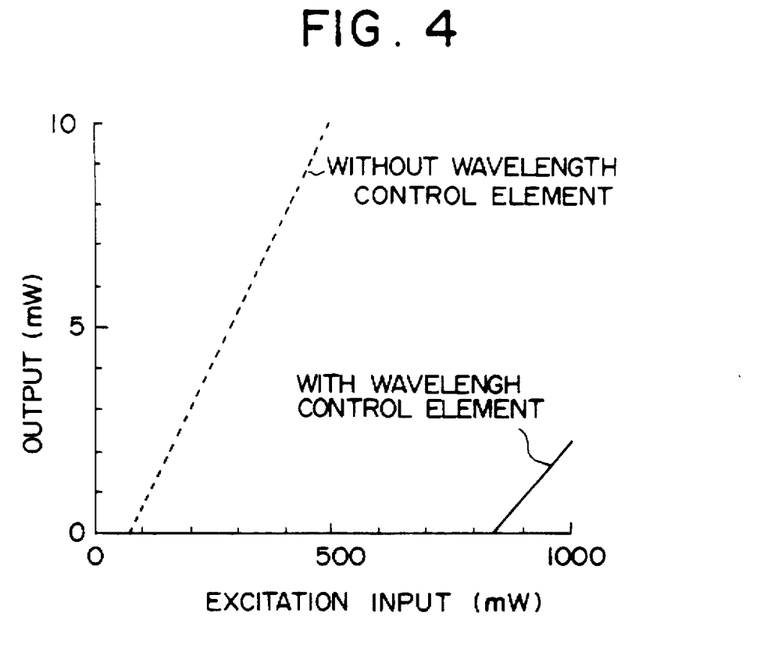
FIG. 4 is a graph showing the comparison of the input/output characteristics of the semiconductor-laser-excited, solid state laser apparatus employing the LiSAF crystal when it is equipped with the wavelength control element and when it is not equipped with the wavelength control element.

The first problem is caused by the fact that the wavelength region other than the transmission band of the wavelength control element leads to loss in the laser resonator; therefore, the oscillation threshold value increases, thus requiring a high output of the exciting semiconductor laser to provide a required SHG laser output. FIG. 4 shows the input/output characteristics of the variable-wavelength solid-state laser apparatus excited by semiconductor laser which employs the LiSAF crystal (hereinafter referred to simply as "LiSAF laser"). The solid line indicates the input/output characteristics of the LiSAF laser with the wavelength control element; the dotted line indicates the input/output characteristics of the LiSAF laser without the wavelength control element. The wavelength control element used herein is composed of three crystal plates having different thicknesses which are employed for a dye laser or Ti sapphire laser. The wavelength control element makes it possible to narrow the band of wavelength, which is allowed to pass through the crystal plates, down to 3 nm or less, thus enabling the wavelength control with the laser oscillation wavelength width of 0.1 nm or less. As shown in FIG. 4, the loss in the resonator increases when the wavelength control element with a narrow transmission wavelength bandwidth is inserted and the oscillation threshold value is accordingly increased by 10 times or more. Hence, 10-fold or more excitation input is required to obtain the same level of output which is obtained when no wavelength control element is inserted. This results in the need of a large semiconductor laser and eventually a large apparatus which consumes much electric power for driving the semiconductor laser and also for cooling. The oscillation wavelength width obtained when no wavelength control element was inserted was approximately 10 nm which was 100 or more times that obtained when the wavelength control element was inserted.

Figure 5:
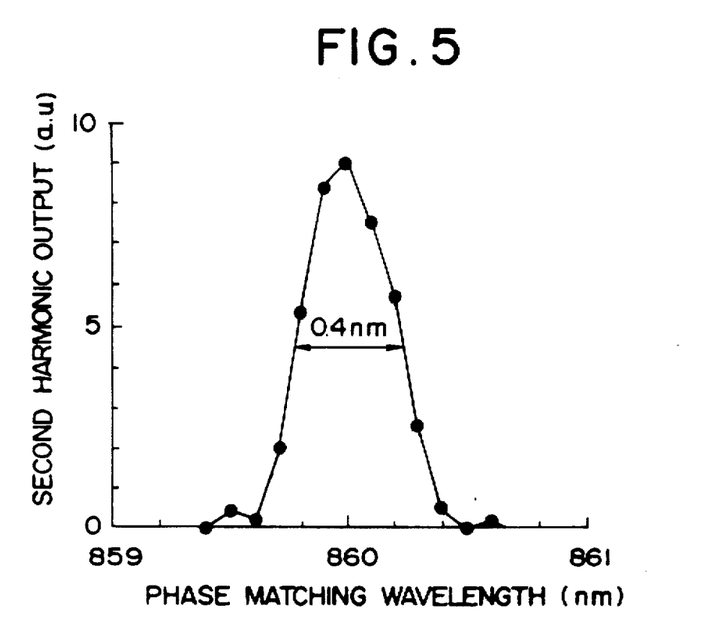
FIG. 5 is a graph illustrating the phase matching wavelength width of the KN crystal.

The following describes the second problem: the KN crystal of the nonlinear crystal, which has conventionally been used and which is capable of providing the blue SHG light, has an extremely narrow phase matching wavelength half value width, namely, 0.4 nm as shown in FIG. 5, the phase matching wavelength half value width being the phase wavelength width at which the SHG wave is generated. In addition, the propagation loss of the KN crystal is high, 0.5%/cm, leading to larger loss in the resonator with a resultant higher oscillation threshold value. Hence, no satisfactory SH output even if the KN crystal is inserted in the LiSAF laser.

Furthermore, there was still another problem in that the KN crystal is affected by changes in the temperature of the crystal and the wavelength at which the maximum conversion efficiency of the KN crystal is obtained changes by 0.3 nm/°C, and therefore stable SH output from the KN crystal cannot be secured unless accurate temperature control of the KN crystal is carried out.

SUMMARY OF THE INVENTION

Accordingly, it is an object of the present invention to solve the shortcomings described above.

It is another object of the present invention to achieve higher efficiency and reliability of a second harmonic generating apparatus with intracavity doubling laser which employs a variable-wavelength laser and, more particularly, the LiSAF laser.

It is still another object of the present invention to achieve higher efficiency and reliability of the second harmonic generating apparatus with the intracavity doubling laser which employs a variable-wavelength laser and, more particularly, the LiSAF laser, by reducing the oscillation threshold value by expanding the transmission wavelength width of the wavelength control element and by employing an LBO crystal which is an SHG crystal featuring a broad phase matching width.

It is a further object of the present invention to improve the reliability of a laser printer or other applied products by using the second harmonic generating apparatus as the light source.

It is a still further object of the present invention to provide a second harmonic generating apparatus which is equipped with a semiconductor laser serving as an exciting light source, a resonator structure for oscillating the first radiation emitted from the LiSAF ((Cr:LiSrAlF$_6$: Lithium strontium aluminum fluoride with chromium added) crystal which is the solid-state laser crystal excited by the exciting light source, and a control element for controlling the wavelength of the first oscillation wave; wherein a nonlinear crystal for performing wavelength conversion into second harmonic which is a second oscillation wave, with the first oscillation wave serving as the fundamental wave, the nonlinear crystal being provided in the resonator.

DETAILED DESCRIPTION OF THE PREFERRED EMBODIMENTS

The preferred embodiments of the present invention will now be described with reference to the accompanying drawings.

The inventors have concluded that the problems described above can be solved by using a second harmonic generating apparatus which is equipped with a semiconductor laser serving as an exciting light source, a resonator structure for oscillating the first radiation emitted from the LiSAF ((Cr:LiSrAlF$_6$: Lithium strontium aluminum fluoride with chromium added) crystal which is the solid-state laser crystal excited by said exciting light source, and a control element for controlling the wavelength of the first oscillation wave; wherein a nonlinear crystal for converting the first oscillation wave, which serves as the fundamental wave, into the second harmonic wave which is the second oscillation wave, is provided in the resonator.

Further, the inventors have found that a birefringent filter tilted at Brewster angle can be used as the element for controlling the oscillation wavelength of the solid-state laser crystal. Crystal (SiO$_2$), LiNbO$_3$ or LiTaO$_3$ may be employed for the birefringent filter.

Preferably, a single crystal plate which is 0.4 to 3 mm thick is used as the birefringent filter.

Further preferably, LBO (LiB$_3$O$_5$) and/or BBO (β-BaB$_2$O$_4$) is used for the nonlinear crystal.

For a good result, the element for controlling the oscillation wavelength of the solid-state laser crystal should be a resonator mirror which causes the first radiation wave to resonate. Further, the wavelength bandwidth of the first oscillation wave for which the reflectance of the resonator mirror is 99.9% or more is 10 nm or less with respect to the central wavelength.

For a good result, the resonator structure should consist of at least two mirrors or at least one mirror constituting the resonator structure should provide a transmittance of 60% or more for the second harmonic.

The second harmonic generating apparatus described above can be employed for a laser printer, photofabrication apparatus, and optical recording apparatus.

The structural restrictions are given for the following reasons.

Figure 6:
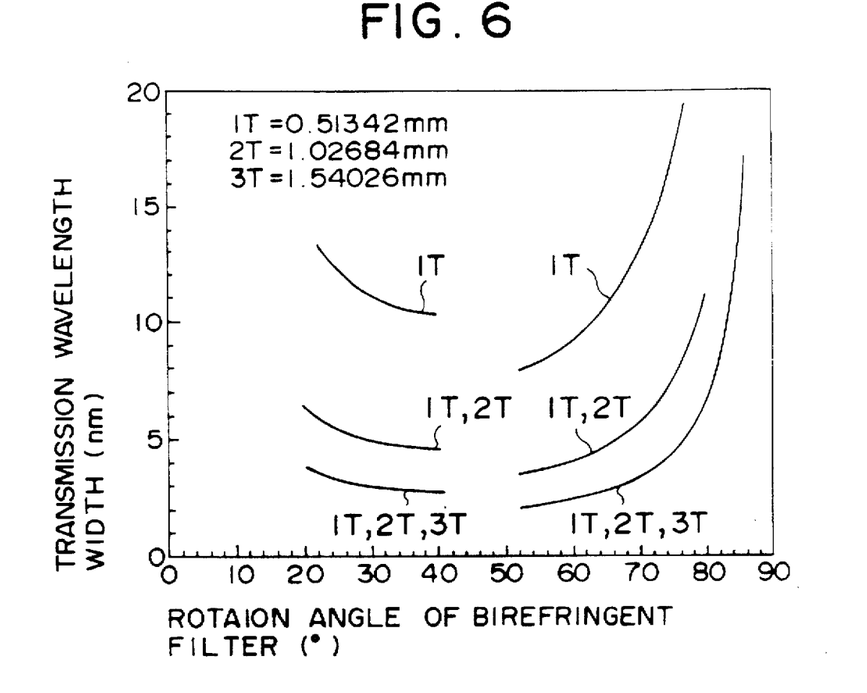
FIG. 6 is a graph illustrating the comparison of transmission wavelength widths obtained from different number of birefringent filter.

The inventors studied the transmission wavelength width of the birefringent filter, which is the wavelength control element because the transmission wavelength width is responsible for the increased oscillation threshold when the birefringent filter is used as the element for controlling the oscillation wavelength of the first oscillation wave generated by the solid-state laser crystal. In general, the oscillation characteristics of a laser resonator depends on the loss produced in the resonator, and the threshold value for triggering oscillation increases as the loss increases. Further, a narrower transmission bandwidth of the wavelength control element leads to a higher oscillation threshold value due to greater loss in the resonator. FIG. 6 shows the transmission wavelength widths obtained from different combinations of birefringent filter plates which are set at Brewster angle. It is seen from FIG. 6 that the transmission wavelength width grows narrower as the number of the birefringent filter plates, i.e. the thickness of the birefringent filter, is increased. It has been found, therefore, that the transmission wavelength width can be expanded and the oscillation threshold value can be reduced by decreasing the number of the birefringent filter plates, i.e. the thickness of the birefringent filter.

Other birefringent filter such as LiNbO$_3$ and LiTaO$_3$ may be used for this purpose.

Figure 9:
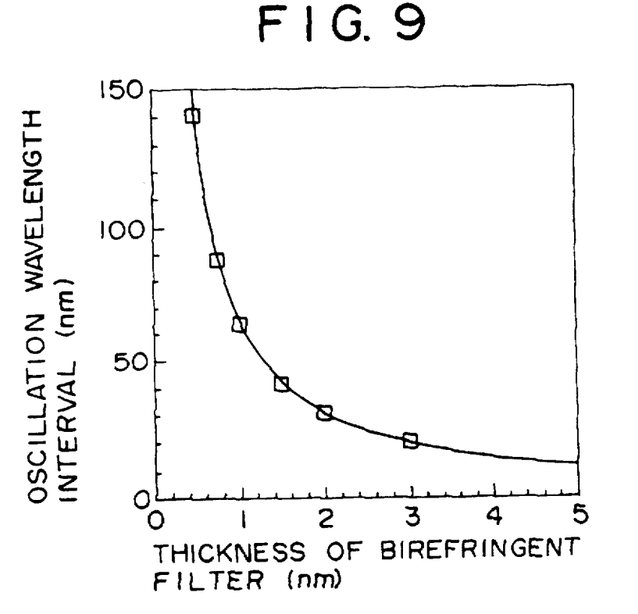
FIG. 9 is a diagram illustrating the oscillation wavelength intervals with respect to the thickness of the birefringent filter.

FIG. 9 shows the laser oscillation wavelength intervals with respect to the thickness of the birefringent filter which are observed when a single birefringent filter plate is used. The laser oscillation wavelength intervals are defined as the wavelength intervals which enable simultaneous laser oscillation. The laser oscillation wavelength intervals depend on the gain characteristic of a laser medium with respect to wavelength. Hence, a wider gain range means a wider wavelength range wherein laser oscillation can be performed; therefore, simultaneous laser oscillation may take place depending on the transmission wavelength interval of the wavelength control element. It is seen from FIG. 9 that the laser oscillation wavelength interval grows smaller as the thickness of the birefringent filter is increased. This indicates that, as the birefringent filter grows thicker, the intervals of the adjoining wavelengths at which laser oscillation can be performed grow smaller, leading to the likelihood of oscillation at two or more oscillation wavelengths at the same time in the case of a laser such as the LiSAF laser which is capable of performing oscillation over a broad band. The reflection bandwidth of a typical laser mirror is about 50 nm; therefore, restraining the simultaneous oscillation at two or more wavelengths requires an oscillation wavelength interval of about not less than 25 nm which is about half of the aforesaid reflection bandwidth. Hence, judging from FIG. 9, the thickness of the birefringent filter must be 3 mm or less. In addition, judging from FIG. 9, the thickness of the crystal must be 0.4 mm or more because the wavelength control would be difficult if the crystal is too thin and also because the oscillation wavelength width of the LiSAF laser is approximately 20 nm. Thus, it is concluded that the oscillation threshold value can further be reduced with the thickness of the birefringent filter set within a range of 0.4 to 3 mm.

Figure 7:
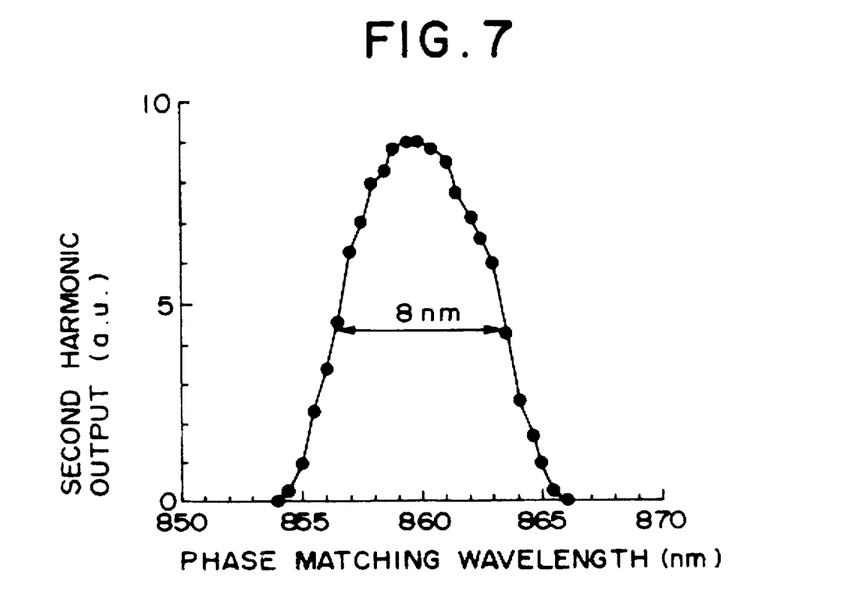
FIG. 7 is a graph illustrating the phase matching wavelength width of the LBO crystal.

As described above, although the oscillation threshold value can be reduced by employing the birefringent filter, the oscillation wavelength width grows larger as the transmission wavelength width is increased. As a result, the oscillation wavelength width exceeds the phase matching half value width of the SHG crystal, preventing efficient the second harmonic. The inventors have concluded that the efficiency can be improved by using LBO (LiB$_3$O$_5$) crystal or BBO (β-BaB$_2$O$_4$) crystal which has a relative broad phase matching half value width as the SHG crystal. FIG. 7 shows the phase matching wavelength half value width of the LBO crystal. The phase matching wavelength half value width of the LBO crystal is 20 times as large as that of the KN crystal; therefore, based on FIG. 6, a single 0.5 mm-thick crystal plate is used as the birefringent filter serving as the wavelength control element so as to obtain a transmission wavelength width of about 10 nm and the crystal plate is set at Brewster angle to avoid the loss in the resonator, thereby achieving the SH output which sufficiently meets the phase matching width of the LBO crystal. The LBO crystal requires no temperature control because it exhibits a small change in phase matching width, 0.1 nm/°C. or less, in response to changes in temperature; it also exhibits small propagation loss, 0.1%/cm, causing minimized loss in the resonator. Use of the BBO crystal provides the same effect as that obtained by the LBO crystal. It is apparent that further stable SH output can be accomplished by controlling the temperature of the SH crystal.

Further, as the element for controlling the oscillation wavelength of the first oscillation wave generated by the solid-state laser crystal, a resonator mirror having a reflectance of 99.9% or more and a wavelength bandwidth of 10 nm or less in relation to the central wavelength may be used instead of the birefringent filter. The SH light can be efficiently taken out of the resonator by adopting a resonator structure constituting the laser resonator which has at least two mirrors and by providing at least one mirror constituting the resonator structure with a transmittance of 60% or more for the second oscillation wavelength, i.e. SH light.

Adopting the means described above has achieved a small and low-electric power consumption second harmonic generating apparatus which is characteristic of the SHG system. The second harmonic generating apparatus can be used as the light source for a laser printer, photofabrication apparatus, and an optical recording apparatus.

[EXAMPLE 1]

Figure 1:
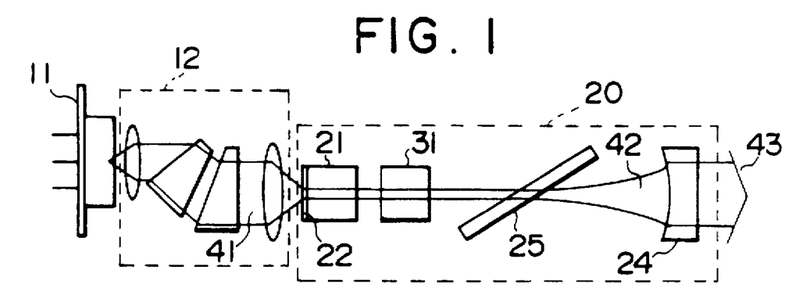
FIG. 1 is a diagram illustrative of an embodiment of the present invention.

FIG. 1 is the diagram illustrative of an embodiment of the present invention. A pumping beam 41 emitted from a semiconductor laser 11 is condensed through a condenser optical system 12 to excite a laser crystal 21. The semiconductor laser 11, which employs an AlGaInP semiconductor laser manufactured by Spectra Diode Lab. (SDL), has output of 500 mW and oscillation wavelength of 670 nm. The condenser optical system 12 used a semiconductor laser collimator (f=8 mm), anamorphic prism pair (x6), and a single lens (f=30 mm).

The excited laser crystal 21 generates the fundamental wave 42 through a solid-state laser resonator 20 which is constituted by a resonator mirror 22 on the incident side which is formed on an end surface of the laser crystal and an output mirror 24. Disposed in the solid-state laser resonator 20 are the laser crystal 21, an SHG crystal 31, and a wavelength control element 25. The solid-state laser resonator 20 is a plano-concave type resonator, the radius of curvature of the output mirror 24 being 150 mm and the length of the resonator being 145 mm. For the laser crystal 21, LiSAF crystal (φ3×5 mm) with 1.5 mol % of Cr added was used. The front end surface of the LiSAF crystal was provided with anti-reflection (hereinafter referred to simply as "AR") coating, the reflectance of which is 2% or less with respect to excitation wavelength, or high-reflection (hereinafter referred to simply as "HR") coating, the reflectance of which is 99% or more with respect to the wavelength of the fundamental wave. The rear end surface was provided with the AR coating, which exhibits reflectance of 0.2% or less with respect to the wavelength of the fundamental wave, to form the resonator mirror 22 on the incident side.

An SHG crystal, which employed LBO crystal measuring 3×3×5 mm, was immediately located behind the LiSAF crystal 21. Both end surfaces of the LBO crystal were provided with the AR coating which provides a reflectance of 0.2% or less for the wavelength of the fundamental wave and a reflectance of 1% or less for the SH wavelength. For the wavelength control element 25, a birefringent filter consisting of a single 0.5 mm-thick crystal plate was employed. The wavelength control element 25 was set at Brewster angle in relation to the optical axis and rotated around the optical axis to perform wavelength control so as to obtain the wavelength which enables the LBO crystal, i.e. the SHG crystal 31, to perform maximum conversion efficiency. In the resonator, a part of the fundamental wave is converted into an SH wave 43 through the SHG crystal 31 and the SH wave 43 is taken out as the SH output from the resonator through the output mirror 24. The oscillation threshold value in this structure is about double that obtained when no wavelength control element is provided as shown in FIG. 4. An SH output of 10 mW was obtained.

The longitudinal positional relationship between the SHG crystal 31 and the wavelength control element 25 which are inserted in the resonator shown in FIG. 1 in the present invention may be reversed. The LiSAF crystal 21 has a broad allowable wavelength width of absorption, approximately 100 nm; the exciting semiconductor laser was not subjected to the wavelength control performed using a temperature control element or the like. The temperature control of the exciting semiconductor laser, however, may be carried out to control the wavelength to the maximum absorption wavelength of the Lisaf crystal.

[COMPARATIVE EXAMPLE 1]

A single 5 mm-thick crystal plate was employed as the wavelength control element 25 and an KN crystal was used as the SHG crystal 31 in a laser resonator which is similar to that shown in FIG. 1. The laser oscillation wavelength interval given by the wavelength control element consisting of the 5 mm-thick crystal plate was narrow, 12 nm; therefore, four or five fundamental waves oscillated by the laser crystal 21, which serves as the LiSAF crystal, were emitted at the same time at 12 nm intervals. Further, the KN cystal serving as the SHG crystal has a narrow phase matching wavelength half value width, 0.4 nm; therefore, even if only one wavelength of the fundamental wave was matched to the KN crystal, the laser oscillation was triggered at other wavelength. As a result, the power of the fundamental wave was dispersed and an SH output of only about several nW was obtained.

[EXAMPLE 2]

Figure 2:
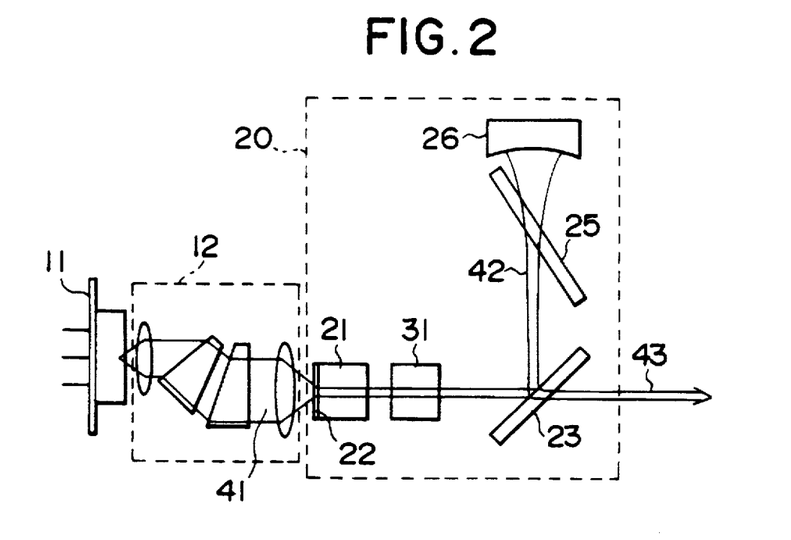
FIG. 2 is a diagram illustrative of another embodiment of the present invention.

FIG. 2 is the diagram illustrative of another embodiment in accordance with the present invention. The exciting optical system composed of the semiconductor laser 11 and the condenser optical system 12 is the same as that of the example 1. The excited laser crystal 21 generates the fundamental wave 42 through the solid-state laser resonator 20 consisting of three resonator mirrors, namely, the resonator mirror 22 on the incident side which is formed on an end surface of the laser crystal 21, a concave mirror 26, and a flat output mirror 23. In the solid-state laser resonator 20, the laser crystal 21 and the SHG crystal 31 were disposed between the resonator mirror 22 on the incident side and the flat output mirror 23, and the wavelength control element 25 was disposed between the flat output mirror 23 and the concave mirror 26. The materials, shapes, and coatings used for the laser crystal 21 and the SHG crystal 31 for this purpose are the same as those used in the example 1. The wavelength control element 25 was same as that of the example 1.

The concave mirror 26 was provided with HR coating which provides a reflectance of 99% or more for the wavelength of the fundamental wave. The flat output mirror 23 was provided with AR coating which gives a reflectance of 99% or more for the wavelength of the fundamental wave and AR coating which provides a transmittance of 85% or more for the wavelength of the SH wave. The wavelength control element 25 was rotated around the optical axis to perform wavelength control so as to obtain the wavelength which enables the LBO cystal, i.e. the SHG crystal 31, to perform maximum conversion efficiency. In the resonator, a part of the fundamental wave is converted into the SH wave 43 through the SHG crystal 31 and it is taken out as the SH output 43 from the resonator through the flat output mirror 23. According to this structure, the wavelength control element 25 does not cause loss of the SH ray shown in FIG. 1; therefore, an SH output of 15 mW was obtained.

[EXAMPLE 3]

Figure 3:
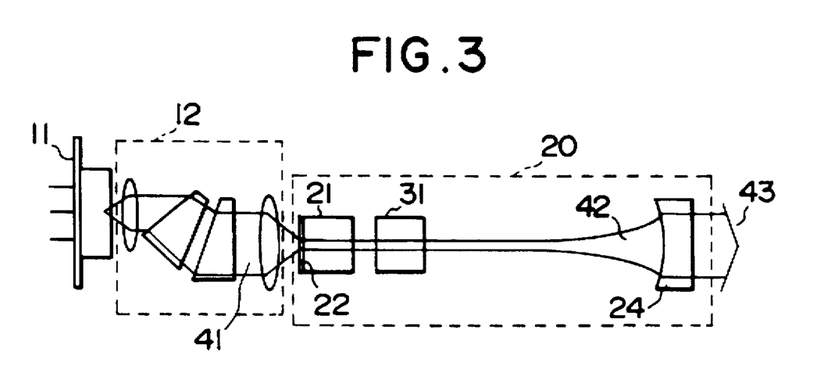
FIG. 3 is a diagram illustrative of still another embodiment of the present invention.

FIG. 3 is the diagram illustrative of another embodiment in accordance with the present invention. This embodiment employed the same exciting optical system, which includes the semiconductor laser 11 and the condenser optical system 12, as that of the example 1. The excited laser crystal 21 generates the fundamental wave 42 through the solid-state laser resonator 20 comprised of the resonator mirror 22 on the incident side which is formed on an end surface of the laser crystal and the output mirror 24. The materials, shapes, and coatings used for the laser crystal 21 and the SHG crystal 31 for this purpose are the same as those used in the example 1. The output mirror 24 was provided with HR coating of a reflectance of 99.9% or more with respect to the wavelength of the fundamental wave with a central wavelength of 860 nm±5 nm and therefore the oscillation wavelength can be controlled without using the wavelength control element; it is provided with AR coating which provides a transmittance of 85% or more for the wavelength of the SH wave. As shown FIG. 7, the half value width of the phase matching wavelength of the LBO crystal serving as the SHG crystal 31 is broad, 8 nm, and hence the SH wave can be efficiently obtained without any particular need for wavelength control.

[EXAMPLE 4]

Figure 8:
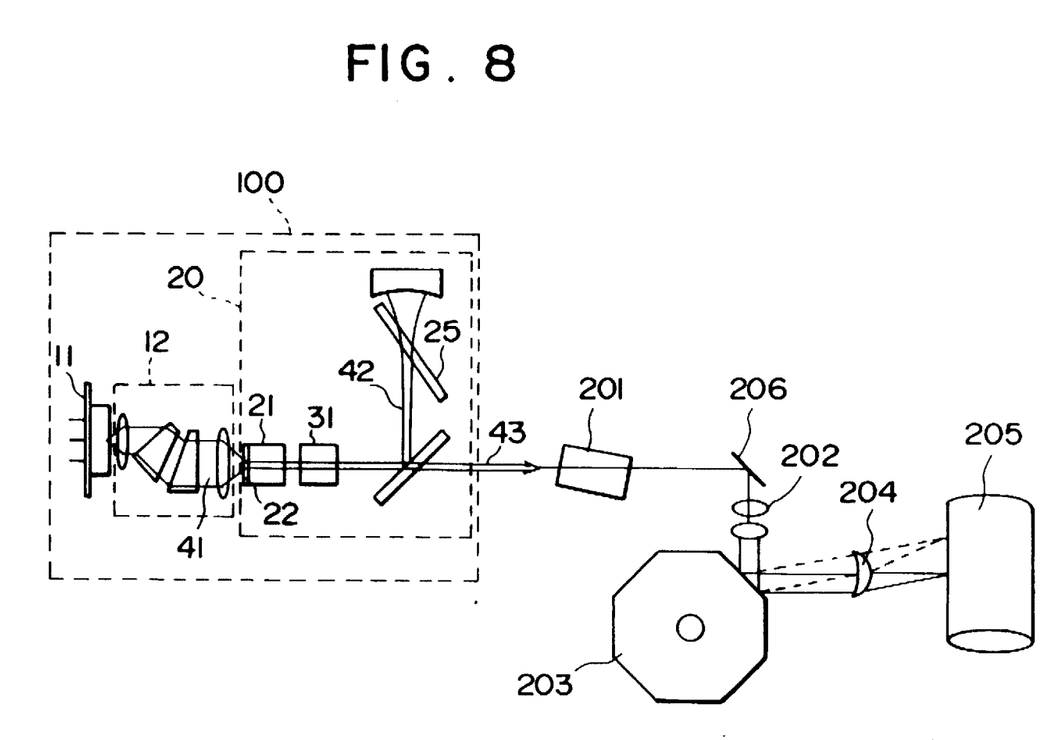
FIG. 8 is a diagram illustrative of yet another embodiment of the present invention.

FIG. 8 is the diagram illustrative of an embodiment wherein the present invention is applied. The SH output 43 issued from a second harmonic generating apparatus 100 described in the example 2 passes through an acousto-optical (hereinafter referred to simply as "AO") modulator 201, a reflecting mirror 206, a beam expander 202, a rotary polygon mirror 203, and an fθ lens 204 to be converged onto a photosensitive drum 205. The AO modulator 201 modulates the SH output 43 in accordance with image information; the rotary polygon mirror 203 scans in the horizontal direction (within the paper surface). This causes two-dimensional information to be recorded on the photosensitive drum 205 in the form of a partial potential difference. The photosensitive drum 205 rotates while applying toner in accordance with the aforesaid potential difference so as to reproduce the information on recording paper.

[EXAMPLE 5]

Figure 11:
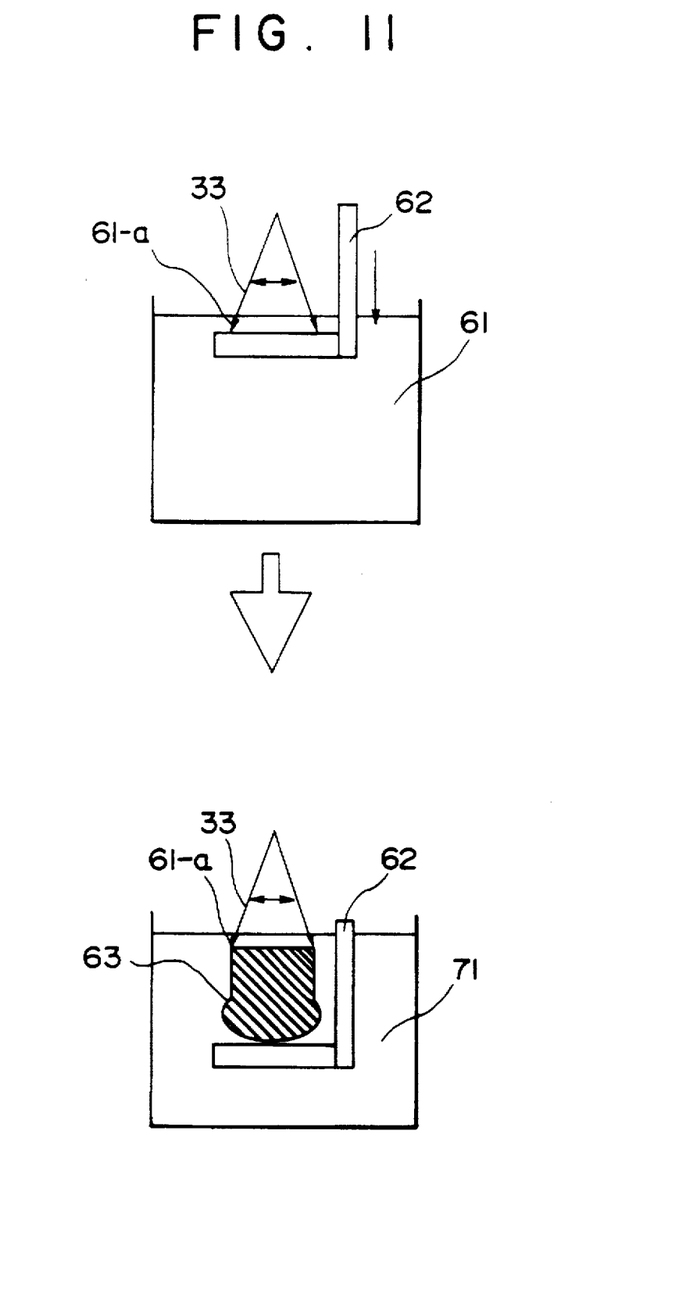
FIG. 11 is a diagram illustrative of an embodiment to which the present invention is applied.

FIG. 11 is the diagram illustrative of the application example wherein an embodiment of the present invention is applied to a photofabrication apparatus. The SHG laser light source stated in the example 1 was employed as the light source. A container was filled with blue laser beam hardening resin 61 and the liquid surface is scanned in a two-dimensional manner with a laser beam. This causes the blue laser beam hardening resin 61 to harden only in a liquid surface portion 61-a which has absorbed the blue laser beam. After completion of the formation of one layer, an elevator 62 comes down to produce the next layer in succession. This series of operations created a three-dimensional model 63 in a desired shape. The SHG laser light source for this purpose was set for a wavelength of 430 nm and an output of 10 mW.

[EXAMPLE 6]

Figure 12:
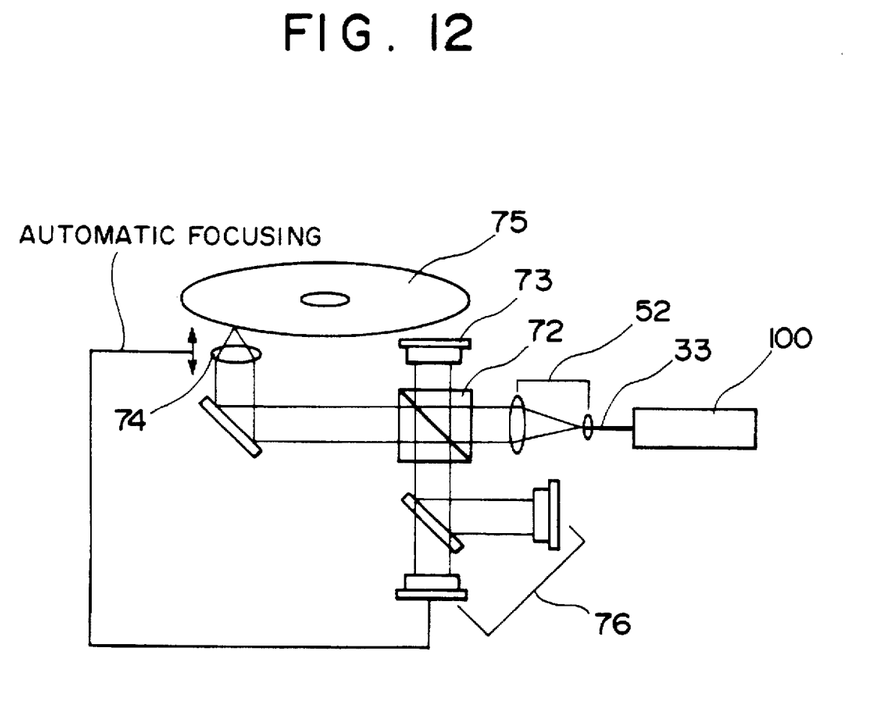
FIG. 12 a diagram illustrative of another embodiment to which the present invention is applied.

FIG. 12 is the diagram illustrative of an application example wherein an embodiment of the present invention is applied to an optical disk apparatus. As the light source, the SHG laser light source mentioned in the example 1 was employed. The optical disk apparatus employed the magneto-optical recording system. The SHG laser output 33 issued from the SHG laser light source is expanded through the beam expander 52 and then it becomes a parallel beam. The beam which is partially reflected by a beam splitter 72 is captured by a front monitor 73. The beam which has passed through the beam splitter 72 is converged onto a medium 75 through a condenser optical system 74, while the reflected light is partially reflected by the beam splitter 72 before it is split into two beams which are captures by two detectors 76. The front monitor 73 monitors the SHG laser output 33 to control the SHG laser output 33. The two detectors 76 which follow the beam splitter 72 perform automatic focusing and signal detection.

The medium 75, which has a predetermined magnetic field printed on, modulated the SHG laser output 33 to increase the focus temperature until Curie temperature of the medium 75 was reached so as to reverse the magnetization, thereby accomplishing the recording. More specifically, the magnetic field of the medium is reversed when the output is ON; the magnetic field is not reversed when the output is OFF, thus enabling a signal to be recorded. The recording frequency was set to 10 MHz. The same SHG laser light source 100 as that used for recording was employed for reproducing the signal with a successful result.

According to the present invention, in a intracavity doubling type SHG system which employs a variable-wavelength laser, especially the LiSAF laser, the oscillation threshold value has been reduced by increasing the transmission wavelength width and the efficiency and reliability of the second harmonic generating apparatus have been improved by employing the LBO crystal which is an SHG crystal featuring a broad phase matching half value width range. Further, the reliability of a laser printer and other applied products has been improved by using the second harmonic generating apparatus as the light source.

The preferred embodiments described herein are illustrative and not restrictive, the scope of the invention being indicated by the appended claims and all modifications which come within the meaning of the claims are intended to be embraced therein.

We claim:

1. A second harmonic generating apparatus comprising:
   a semiconductor laser emitting a pumping beam; and
   a resonator structure having:
   an LiSAF crystal serving as a solid-state laser crystal, the LiSAF crystal receiving and being excited by the pumping beam from the semiconductor laser to thereby generate a first oscillation wave,
   a nonlinear crystal for receiving the first oscillation wave and converting a first portion of the first oscillation wave into a second oscillation wave, the second oscillation wave having a wavelength converted into a second harmonic from a wavelength of the first oscillation wave, the nonlinear crystal outputting the second oscillation wave and a second portion of the first oscillation wave, the second portion of the first oscillation wave serving as a fundamental wave, the nonlinear crystal being provided in said resonator,
   a control element for receiving the fundamental wave as the fundamental wave travels along an optical axis, the control element controlling the wavelength of the fundament wave, the control element being formed of a birefringent crystal arranged at a Brewster angle with respect to the optical axis of the received fundamental wave, and
   an output device for outputting from the resonator the second oscillation wave.

2. A second harmonic generating apparatus according to claim 1, wherein at least one of crystal ($SiO_2$), $LiNbO_3$, and $LiTaO_3$ is used for said birefringent crystal.

3. A second harmonic generating apparatus according to claim 3, wherein said birefringent crystal uses a single crystal plate which is 0.4 to 3 mm thick.

4. A second harmonic generating apparatus according to claim 1, wherein LBO or BBO is used for said nonlinear crystal.

5. A second harmonic generating apparatus according to claim 1, wherein
   the fundamental wave has a central wavelength and a wavelength bandwidth,
   said control element comprises a resonator mirror for resonating the fundamental wave,
   the reflectance of said resonator mirror is 99.9% or more for the wavelength bandwidth of the fundamental wave, and the wavelength bandwidth of the fundamental wave is 10 nm or less.

6. A second harmonic generating apparatus according to claim 1, wherein said resonator structure comprises at least two mirrors.

7. A second harmonic generating apparatus according to claim 6, wherein at least one mirror constituting said resonator structure has a transmittance of 60% or more for said second harmonic.

8. A second harmonic generating apparatus comprising:

a semiconductor laser emitting a pumping beam; and a resonator structure having:
- an LiSAF crystal serving as a solid-state laser crystal, the LiSAF crystal receiving and being excited by the pumping beam from the semiconductor laser to thereby generate a first oscillation wave,
- a nonlinear crystal for receiving the first oscillation wave and converting a first portion of the first oscillation wave into a second oscillation wave, the second oscillation wave having a wavelength converted into a second harmonic from a wavelength of the first oscillation wave, the nonlinear crystal outputting the second oscillation wave and a second portion of the first oscillation wave, the second portion of the first oscillation wave serving as a fundamental wave, the nonlinear crystal being LBO or BBO and being provided in said resonator,
- a single crystal plate having a thickness of 0.4 to 3 mm for receiving the fundamental wave as the fundamental wave travels along an optical axis, the single crystal plate controlling the wavelength of the fundament wave, the single crystal plate being formed of a birefringent crystal arranged at a Brewster angle with respect to the optical axis of the received fundamental wave, and
- an output device for outputting from the resonator the second oscillation wave.

9. A second harmonic generating apparatus according to claim 8, wherein the resonator structure includes at least two mirrors.

10. A second harmonic generating apparatus according to claim 9, wherein at least one of the mirrors of the resonator structure has a transmittance of 60% or more for the second harmonic.

11. A laser applied apparatus provided with and employing a second harmonic generating apparatus, the second harmonic generating apparatus comprising:

a semiconductor laser emitting a pumping beam; and a resonator structure having:
- an LiSAF crystal serving as a solid-state laser crystal, the LiSAF crystal receiving and being excited by the pumping beam from the semiconductor laser to thereby generate a first oscillation wave,
- a nonlinear crystal for receiving the first oscillation wave and converting a first portion of the first oscillation wave into a second oscillation wave, the second oscillation wave having a wavelength converted into a second harmonic from a wavelength of the first oscillation wave, the nonlinear crystal outputting the second oscillation wave and a second portion of the first oscillation wave, the second portion of the first oscillation wave serving as a fundamental wave, the nonlinear crystal being provided in said resonator,
- a control element for receiving the fundamental wave as the fundamental wave travels along an optical axis, the control element controlling the wavelength of the fundament wave, the control element being formed of a birefringent crystal arranged at a Brewster angle with respect to the optical axis of the received fundamental wave, and
- an output device for outputting from the resonator the second oscillation wave.

12. A laser-applied apparatus according to claim 11, which comprises a laser printer.

13. A laser-applied apparatus according to claim 11, which comprises a photofabrication apparatus.

14. A laser-applied apparatus according to claim 11, which comprises an optical recording apparatus.

15. A laser applied apparatus provided with and employing a second harmonic generating apparatus, the second harmonic generating apparatus comprising:

a semiconductor laser emitting a pumping beam; and a resonator structure having:
- an LiSAF crystal serving as a solid-state laser crystal, the LiSAF crystal receiving and being excited by the pumping beam from the semiconductor laser to thereby generate a first oscillation wave,
- a nonlinear crystal for receiving the first oscillation wave and converting a first portion of the first oscillation wave into a second oscillation wave, the second oscillation wave having a wavelength converted into a second harmonic from a wavelength of the first oscillation wave, the nonlinear crystal outputting the second oscillation wave and a second portion of the first oscillation wave, the second portion of the first oscillation wave serving as a fundamental wave, the nonlinear crystal being LBO or BBO and being provided in said resonator,
- a single crystal plate having a thickness of 0.4 to 3 mm for receiving the fundamental wave as the fundamental wave travels along an optical axis, the single crystal plate controlling the wavelength of the fundament wave, the single crystal plate being formed of a birefringent crystal arranged at a Brewster angle with respect to the optical axis of the received fundamental wave, and
- an output device for outputting from the resonator the second oscillation wave.

16. A laser-applied apparatus according to claim 15, which comprises a laser printer.

17. A laser-applied apparatus according to claim 15, which comprises a photofabrication apparatus.

18. A laser-applied apparatus according to claim 15, which comprises an optical recording apparatus.

* * * * *